United States Patent
Spolsino et al.

[15] 3,645,315
[45] Feb. 29, 1972

[54] ALL TERRAIN VEHICLE TIRES

[72] Inventors: Peter P. Spolsino, Revere; Nicholas V. Riselli, Belmont; Kenneth C. Bushway, Waltham, all of Mass.

[73] Assignee: The B. F. Goodrich Company, New York, N.Y.

[22] Filed: Oct. 31, 1969

[21] Appl. No.: 872,924

[52] U.S. Cl............................................................152/383
[51] Int. Cl..................................................................B60c 5/16
[58] Field of Search..............................152/9, 383, 40, 399

[56] References Cited

UNITED STATES PATENTS

| | | | |
|---|---|---|---|
| 2,847,050 | 8/1958 | Burke | 152/40 |
| 3,425,475 | 2/1969 | Hoy | 152/9 |

*Primary Examiner*—James B. Marbert
*Attorney*—William A. Shira, Jr. and Joseph Januszkiewicz

[57] ABSTRACT

A tire hub, a method of manufacturing the hub, and the combination of the hub with an integral low-pressure tire are disclosed. The hub is formed of two coaxial, closed end, tubular sections, each having an integral base portion and a flange portion, the bases being in contact and secured to form a single hub with spaced-apart flanges on either end of the hub. The flanges portions of the hub are integrally molded into enlarged sidewall portions of an inflatable tire of elastomeric material thus forming an integral hub and tire of the low-pressure balloon-type suitable for use on all terrain vehicles.

5 Claims, 5 Drawing Figures

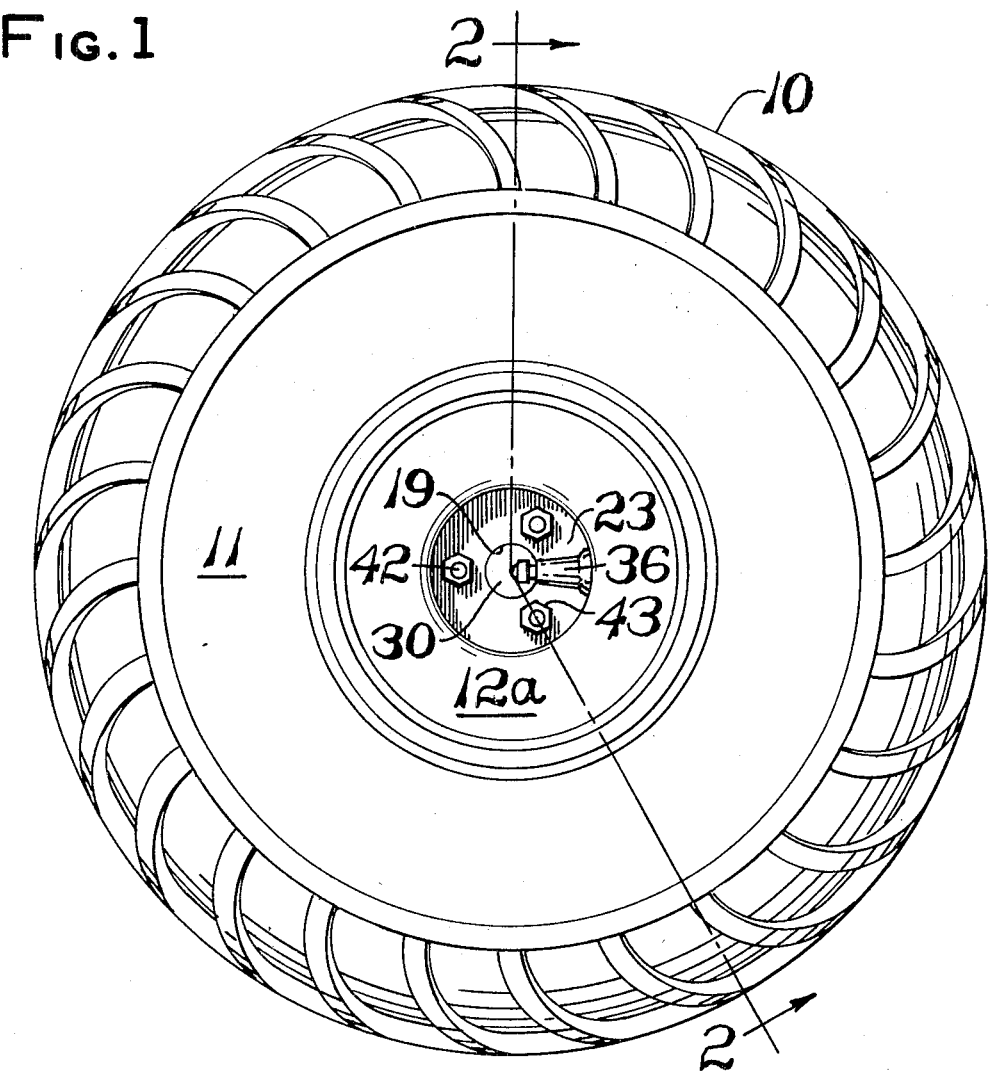
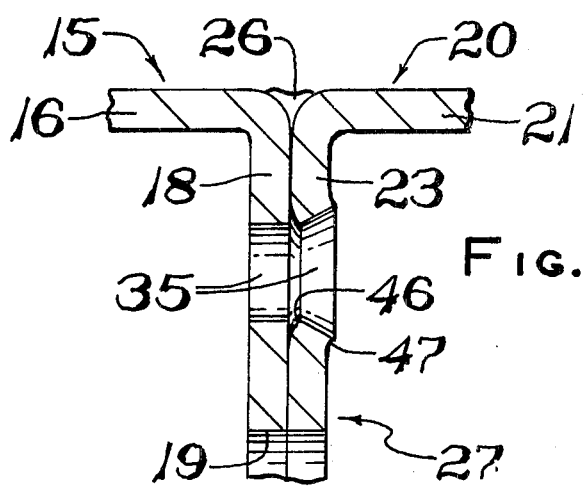

INVENTORS
PETER P. SPOLSINO
NICHOLAS V. RISELLI
KENNETH C. BUSHWAY
BY
Thomas G. Schmitz
ATTY.

ALL TERRAIN VEHICLE TIRES

BACKGROUND OF THE INVENTION

All Terrain Vehicles (ATV) are amphibious vehicles having the ability to travel over virtually all types of terrain and sometimes have been referred to as Swamp Buggies or Go-Anywhere Vehicles. The ATV is of particular interest for sportsmen, forestry conservationists, recreationists, rescue workers, military personnel, landscapers, commercial construction workers, maintenance workers, and others requiring a means for off-the-road travel. The ATV is particularly useful for traveling over various terrains such as swamps, muck, snow, sand, bog and rock. These vehicles possess further utility for amphibious travel wherein the balloon tires assist in flotation of the vehicle and further provide propulsion movement of the vehicle upon entering the water.

In addition to supporting and propelling the vehicle both on land and in water, the tires for ATV's further provide absorption of shock and impact caused by obstacles present on the terrain. Hence, the tires are of the low-pressure type, commonly referred to as balloon type. They must, nevertheless, be able to withstand the severe torsional stresses and strains imposed by travel of the ATV over irregular terrains.

Various low-pressure balloon tires have been suggested wherein a hub is integrally molded with a rubber tire to form an integral unit. For example, U.S. Pat. No. 3,425,475 discloses an inflatable low-pressure balloon tire having an integral hub for rimless mounting on a driving axle of a low speed vehicle. The driving axle transmits driving torque directly to the tire and hence torsional stresses are not developed between the hub and tire.

Efforts to effect driving through the hubs of such integral tire and hub combinations have generally resulted in hubs with structural deficiencies wherein the welded sections of the hub prematurely fail. The hub ordinarily comprises a tubular portion having a web structure secured to the inner surfaces of the tubular section. The web structure may be welded between two butting tubular sections or, alternatively, a single tubular section may be provided wherein the web section is inserted within the tube and suitably secured by welds to the inside tubular walls. However, due to torsional stresses and strains developing in the hubs and the intermittent impact forces encountered, such hubs prematurely fail in the web structure area. Although the web structure may be strong, metal adjacent to the seams held by the weld fail due to lack of strength.

It now has been found that premature hub failures in balloon tires for All Terrain Vehicles are overcome by providing improved web structures in the hub for absorbing torsional stresses and strains. Further advantages are achieved wherein the tubular sections are maintained in a coaxial relationship and the web section is maintained in a perpendicular relationship with the tubular portions. These and other advantages will become more apparent by referring to the Detailed Description of the Invention.

SUMMARY OF THE INVENTION

In accordance with this invention, a hub, an integral tire and hub, and methods for forming an improved hub and the combination thereof with an integral low-pressure tire are provided. The invention is characterized in that the hub comprises two cup-shaped sections each formed by drawing from a single piece of metal to form a closed end section with the ends or bases of the sections secured together to form a structural web. Continuous metal extends from the tubular portions forming the base portions providing continuous metal in the web section area for absorbing torsional stresses and strains developed in balloon tires on All Terrain Vehicles. The outer ends of the hub sections have integral flanges embedded in elastomeric material of the lower sidewalls of the tire.

To clearly illustrate this invention, reference is made to the presently preferred embodiment of this invention shown in the drawings.

BRIEF DESCRIPTION OF THE DRAWINGS

FIG. 1 is a side elevation view of the presently preferred form of the improved integral tire and hub;

FIG. 5 is an enlarged fragmentary sectional view of the web structure of the hub.

DETAILED DESCRIPTION OF THE INVENTION

Figure 2:
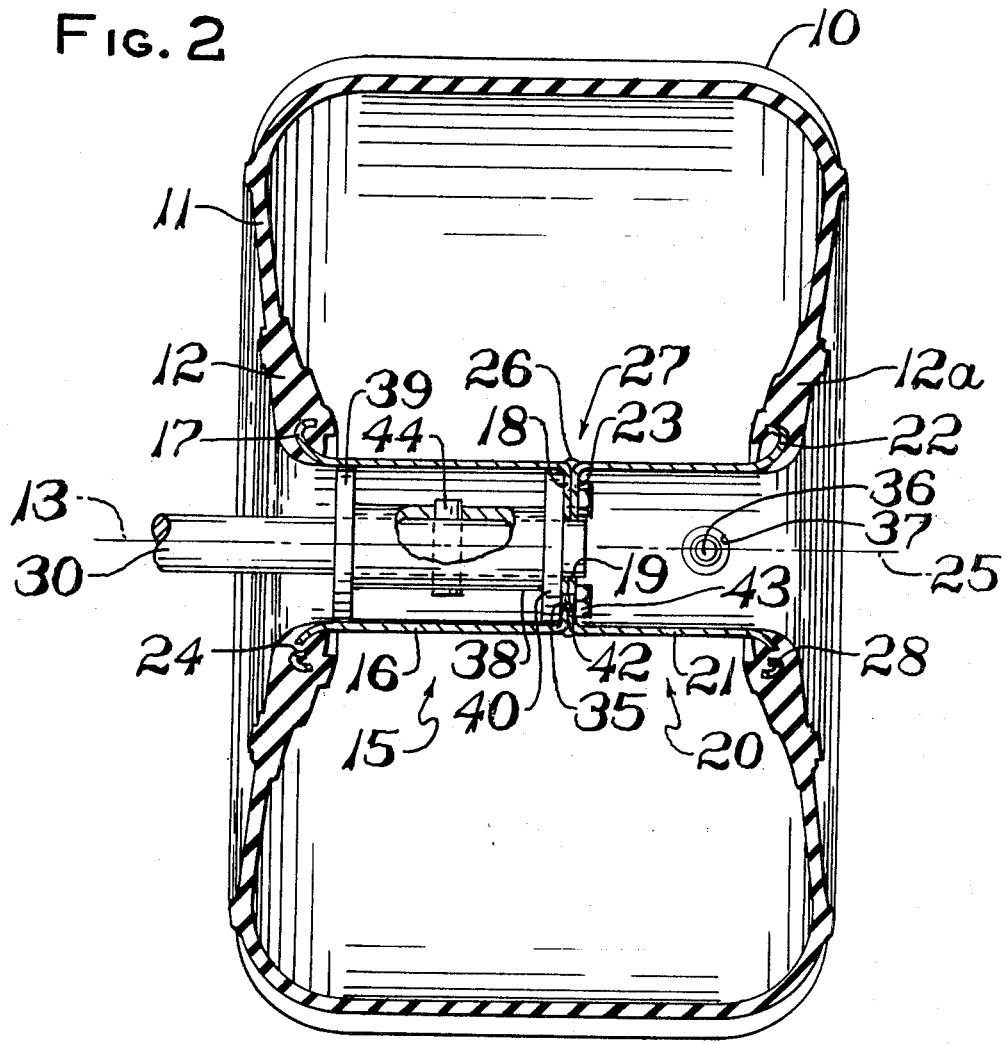
FIG. 2 is an enlarged transverse sectional view taken along line 2—2 of FIG. 1 with portions of the tire broken away.

Referring to the drawings, the invention is illustrated as comprising a tire having an annular tread portion 10 and a sidewall 11 which is shown extending into an enlarged sidewall portion or bead portion 12, which enlarged sidewall portion 12 is integrally interconnected with a hub.

The hub comprises two cup-shaped hub sections 15, 20. Hub section 15 includes a tubular section 16, having a central axis 13, a flange portion 17 and a closed end or base portion 18 wherein the hub section 15 is formed from a single sheet of steel or comparable metal. For example, 14 gage cold rolled steel is suitable for forming hub section 15 wherein tubular section 16 has a five inch draw and an inside diameter of about 2.9 inches. The hub section 16 is provided with a suitable flange 17 having a ⅜-inch depth and a variable radius varying from ½ inch adjacent the tubular portion 16 to a ¼-inch radius at the distal point of flange 17. Hub section 15 may be suitably formed by deep-drawing a sheet of steel and flange portion 17 may be formed by a suitable method such as spinning. In like manner, the second hub section 20 is formed and includes tubular section 21, having a central axis 25, a flange portion 22, and a base portion 23 drawn from a single sheet of metal. The hub sections 15, 20 are coaxially aligned and interconnected having the outer surface of first base portion 18 disposed in an abutting complementary relationship with the outer surface of second base portion 23 wherein the base sections 18, 23 are secured to maintain the respective tubular sections 16, 21 in a coaxial relationship. The respective bases are secured with a peripheral outer bead weld 26. Accordingly, the welded base portions 18, 23 define a web structure 27 having continuous metal extending from the respective tubular sections 16, 21 to the respective bases 18, 23 which continuous metal provides substantial resistance to torsional stresses and strains. The peripheral bead weld 26 further provides substantial strength to web structure 27 and further imparts airtightness to the hub structure.

Figure 3:
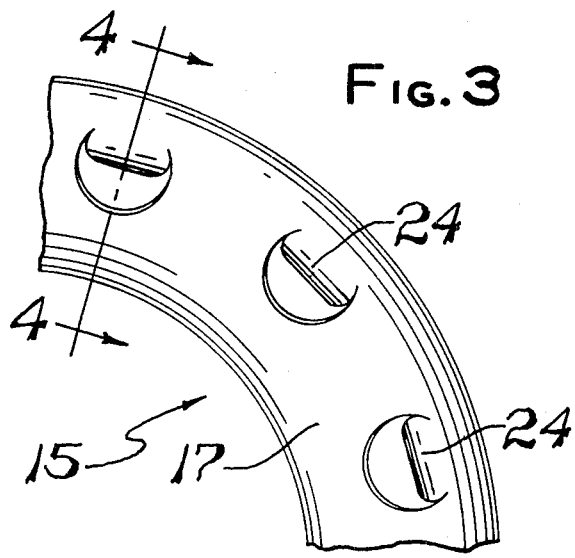
FIG. 3 is a fragmentary enlarged sectional view of a portion of the hub flange.
Figure 4:
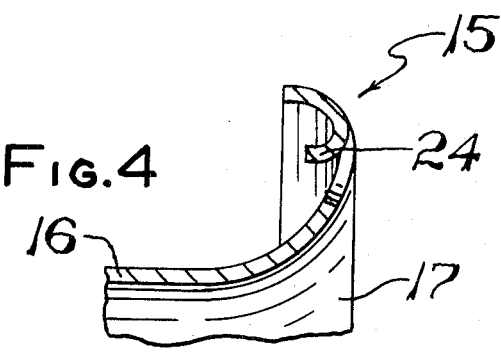
FIG. 4 is a section view taken along line 4—4 of FIG. 3.

The flange portion 17 of first hub section 15 extends into an enlarged sidewall portion 12 of the tire where it is encapsulated within the sidewall portion to provide an integral relationship of a hub and tire thus forming a balloon tire. In like manner, flange 22 of second hub section 20 extends to and is encapsulated within an enlarged sidewall portion 12a of sidewall 11. Flanges 17 and 22 may be provided with a plurality of punch tabs 24 and 28 respectively (FIGS. 3 and 4) which extend from the flanges 17 and 22 and protrude into the enlarged sidewall portion 12, 12a. The punch tabs 24 and 28 aid in anchoring the flanges 17 and 22 within the elastomer material. The enlarged sidewall portions 12, 12a are of such a dimension so as to provide requisite stiffness for transmitting driving torque directly to sidewalls 11, 11. The hub integrally interconnected with the elastomeric material of the tire provides a closed airtight compartment within the tire.

A valve hole 37 is located in the wall of tubular portion 21 of the second hub section 20 for receiving an air valve 36. Air valve 36 may be inserted in the tubular portion 21 at right angles thereto, or alternatively may be inserted at a suitable angle thereto. In use, the tire is ordinarily inflated from about 1 to 5 p.s.i. and preferably from 2 to 4 p.s.i.

The web structure 27 formed by first base portion 18 secured to second base 23 is provided with a central hole 19 for receiving a driving axle means. The web structure 27 is further provided with a plurality of holes 35 equally spaced on the diametrical centers of web structure 27 for securing a drive axle means. For example, a web structure 27 having a 2.88-inch diameter may have a 1-1/16-inch diameter central hole 19 and three 11/32-inch diameter holes 35 equally spaced on 1.97 diameter of centers. In operation, a driving axle means is secured to the web structure 27 for driving the integral hub and tire upon being operatively attached to an ATV. Accordingly, a driving axle 30 is positioned within central hole 19 and further disposed within an adapter bushing 38. The adapter bushing 38 is provided with a supporting flange 39 engaging tubular section 16 for supporting the axle means, and further is provided with a locking flange 40 adapted for being secured to the web structure 27. The locking flange 40 includes a plurality of spaced bolts or lugs 42 located complementary to holes 35. For example, three 11/32-inch diameter threaded studs may be secured to locking flange 40 and equally spaced thereto on a 1.97-inch diameter circle. Lugs 42, therefore, secure the locking flange 40 to the web structure 27 via securing locking nuts 43 and, accordingly, prevents relative rotation therebetween. The axle means further includes a tapered locking pin or other securing means 44 for locking the drive axle 30 to the adapter bushing 38 and thus provides for transmitting torque to the web structure 27 via the driving axle means.

The holes 35 in base portion 23 may be drilled or may be punched. Although not required, punching the holes 35 forms an indented surface 46 peripheral thereto as embodied in FIG. 5. Hence, base portion 23 of second hub section 20 may include the plurality of equally spaced holes 35 provided with indented surfaces 46 peripheral to holes 35 on the outer surface of base 23 and having a flared or raised surface 47 on the inner surface of base 23 peripheral to holes 35. The web structure 27, therefore, may be provided with a space between base portion 18 and base portion 23 adjacent to holes 35 whereby the spaced structure acts as a pressure plate upon being secured to a driving axle means. The web structure 27 provided with or without the spaced structure advantageously transmits driving torque directly to sidewalls 11, 11 as hereinbefore described. Thus, two independent hub sections 15, 20, formed from continuous metal and properly secured, therefore, provide substantial resistance to torsional stresses and strains induced in the hub portion of a balloon tire during use thereof on ATV's.

Having described a preferred embodiment of this invention, a method of combining the hub with a tire portion within the scope of this invention is hereinafter disclosed. The enlarged sidewall portions 12, 12a are integrally molded on the spaced apart flanges 17 and 22. Accordingly, this is effected by introducing elastomeric material suitable for forming tires into the mold cavities of a split mold provided with a suitable core member such that, upon closing the mold and subjecting it to heat and pressure, the elastomeric material is formed into two halves of a tire preform. The split mold is opened and the core member is removed whereupon the hub is positioned with the split mold and in contact with the tire preforms. The flange portions 17, 22 are contacted with enlarged elastomeric sidewall portions 12, 12a of the tire preforms. Prior to contacting flanges 17, 22 with the tire preform, suitable adhesive is preferably applied to the flange portions 17, 22. A wide variety of commercially available adhesives may be employed thereby providing good bonding between the enlarged elastomeric sidewall portions 12, 12a and the flange portions 17, 22. The preforms have sufficient material, or additional rubber polymeric material is added, to provide sufficient elastomeric material for encapsulating the flange portions 17, 22. The mold is again closed and sufficient pressure is provided for forcing the enlarged sidewall portion to flow and encapsulate the flanges 17, 22. Compressed air is introduced into the closed mold for maintaining pressure within the preforms which aids the mating of the two preforms in the tread portion of the tires. Thus, the hub is integrally combined with the elastomeric preforms wherein the elastomeric material is vulcanized under heat and pressure and, accordingly, permanently secures the flange portions 17, 22 within the enlarged bead portion 12, 12a of the vulcanized tire portion.

Although specific embodiments and a preferred mode of operation of the invention has been hereinbefore described, it is understood that the subject invention is not limited thereto. All obvious variations and modifications thereof are contemplated and are included within the spirit and scope of this invention as defined in the appended claims.

What is claimed is:

1. In a low-pressure tire with an integral hub wherein the tire includes an annular tread and sidewalls of elastomeric material extending into an enlarged sidewall portion, and a rigid hub having flange portions integrally molded in the enlarged sidewall portion to form a closed compartment therewith, the improvement which comprises; the hub including a first tubular section having a central axis of rotation; said first tubular section integrally extending into a base portion at one end and extending at the other end into a flange portion directed radially outward from the central axis of said first tubular portion; a second tubular section having a central axis of rotation; said second tubular section integrally extending into a base portion at one end and extending at the other end into a flange portion directed radially outward from the central axis of said second tubular portion; the base of said first tubular section permanently rigidly secured to the base of said second tubular section defining a web structure and the central axis of said first tubular section coaxially aligned with the axis of said second tubular section locating said first flange portion in a spaced relationship with said second flange portion; and the web structure being adapted to receive a driving means.

2. The tire and hub of claim 1 including valve means positioned in said hub and communicating with the closed compartment for introducing inflating fluid therein.

3. The tire and hub of claim 1 wherein the periphery of the union of said base portions is sealed against the passage of fluid.

4. An integral hub and tire, comprising a first metallic tubular section integrally extending into a base portion at one end and extending into a flange portion at the other end, a second metallic tubular section integrally extending into a base portion at one end and extending into a flange portion at the other end with the outer surface of the second base portion being complementary to the outer surface of the first base portion and permanently secured thereto in axial alignment to define a web structure and to locate the first flange in a spaced relationship with the second flange, and an inflatable tire having enlarged sidewall bead portions of elastomeric material with the first flange and the second flange of the hub encapsulated within the said enlarged bead portions of the tire.

5. The combination comprising a low-pressure inflatable tire with an integral metal hub, the tire including an annular tread and axially spaced sidewalls of elastomeric material, the said hub comprising two generally cup-shaped members disposed coaxially with their bases in contact and permanently secured together, the axially outer portions of said cup-shaped members terminating in axially spaced flanges integrally molded in enlarged radially inner portions of the tire sidewalls so that the tire and hub form an annular sealed compartment, the said bases having at least one axially extending opening therethrough for connection to drive means, and valve means in said hub communicating with the interior of said compartment for introduction therein of inflating fluid.

* * * * *